INVENTOR
Harold F. Snider

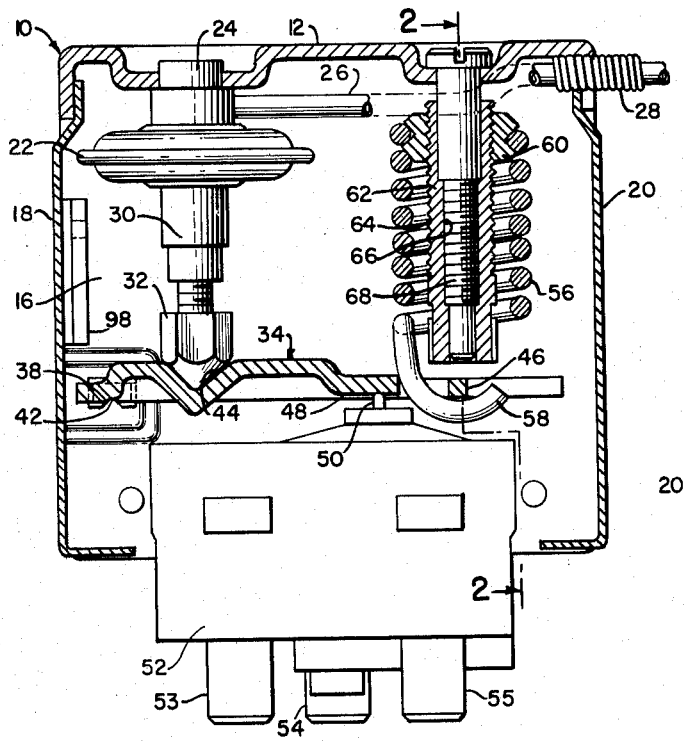
FIG. 1.
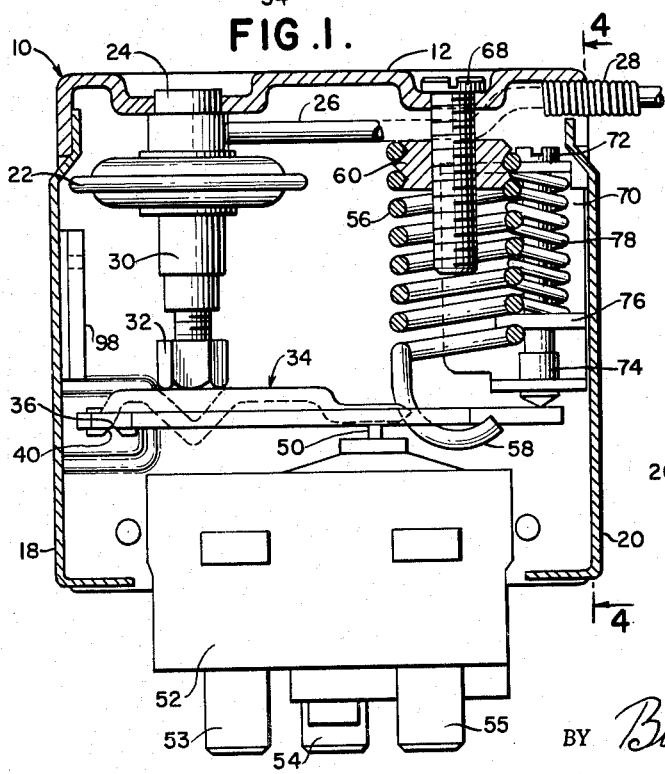
FIG. 3.
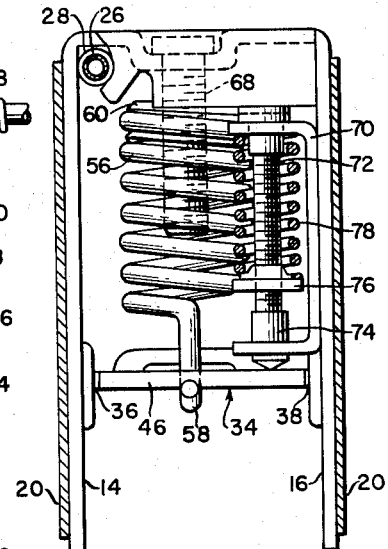
FIG. 2.
FIG. 4.
INVENTOR
Harold F. Snider
BY Birch and O'Brien
ATTORNEYS June 14, 1966 H. F. SNIDER 3,256,398
PRESSURE RESPONSIVE LIMIT CONTROL WITH RANGE
AND DIFFERENTIAL SPRING ADJUSTMENTS
Filed July 24, 1963 2 Sheets-Sheet 2

BY Birch and O'Brien
ATTORNEYS

United States Patent Office 3,256,398
Patented June 14, 1966

3,256,398
PRESSURE RESPONSIVE LIMIT CONTROL WITH RANGE AND DIFFERENTIAL SPRING ADJUSTMENTS
Harold F. Snider, Orange, Conn., assignor to Robertshaw Controls Company, Richmond, Va., a corporation of Delaware
Filed July 24, 1963, Ser. No. 297,385
14 Claims. (Cl. 200—81)

This invention relates to pressure responsive control devices and in particular to such control devices having safety limits and having particular utility as refrigeration controllers in commercial and residential air conditioning systems.

Pressure responsive control devices of the conventional type are presently manufactured and designed in accordance with the requirements of particular systems and of particular installation areas. Even though such devices may serve the purposes for which they were designed, they cannot be modified to conform to varying requirements. Furthermore, these conventional devices have such complex parts so as to be complicated in operation as well as requiring specially trained mechanics for service, installation and repairs.

It is, therefore, an object of the present invention to construct a pressure responsive control device from relatively few parts into a unitary, compact structure.

Another object of this invention is to simplify the construction of a pressure responsive control device for utilization in varying types of systems.

Another object of this invention is to provide a pressure responsive control device with simple changeover features for controlling either the high pressure or low pressure of a system.

This invention has another object in that the range adjusting screw of a pressure responsive controller includes an adjustable high limit stop.

This invention has another object in that a high limit stop for a pressure resonsive controller may be adjusted without changing the range spring force thereof.

It is another object of this invention to provide an automatic reset pressure controller with an adjustable differential.

Another object of the present invention is to manually reset a pressure responsive control device that may be modified for control of either high or low pressures.

Another object of this invention is to adjust the manual reset means of a pressure responsive controller.

It is another object of the present invention to provide a trip flag for a pressure controller which is automatically reset.

A further object of the present invention is to facilitate the sliding movement of an automatically reset trip flag for a pressure responsive controller which may be modified for control of either high or low pressures.

In accordance with the present invention, a pressure responsive control device includes switch means movable between a plurality of circuit controlling positions which is operated by a lever member; lever movement is effected by condition responsive means and by a range spring in accordance with variations beyond a set of predetermined conditions and the switch means includes a plurality of alternately usable terminal posts whereby the control device may be adapted to selectively control a circuit in accordance with the requirements of a particular system. In addition, the basic control device is easily provided with further features such as a high limit stop, a differential adjustment, manual reset means and an indicator for its automatic reset operation.

Other objects and advantages of the present invention will become apparent from the following description of structural components and their sequence of operation taken in connection with the following drawing wherein:

FIG. 1 is a elavation view of a control device embodying the present invention with a front wall removed and with parts shown in section;

FIG. 2 is a section taken along the staggered line 2—2 of FIG. 1;

FIG. 3 is an elevation view similar to FIG. 1 and showing a further feature of the present invention;

FIG. 4 is a section taken along line 4—4 of FIG. 3 with parts removed;

Figure 5:
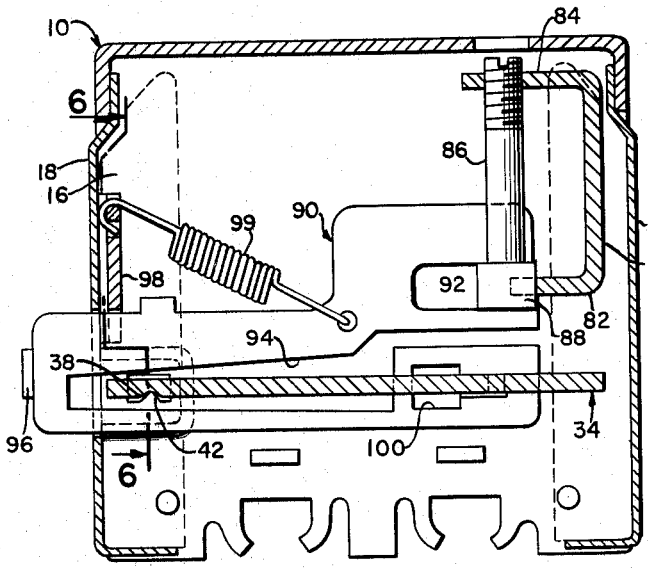
FIG. 5 is an elevation view similar to FIG. 1 with parts removed to show further features of the present invention.

As is illustrated in FIGS. 1 and 2, the basic control device of the present invention includes an inverted U-shaped frame or housing 10 formed by a top wall 12, a front wall 14 and a rear wall 16; the opposite ends of the housing 10 are closed by end plates 18 and 20, respectively, each of which are generally U-shaped and have front and rear side flanges shown in dashed lines in FIG. 5. Centrally positioned between the front and rear walls 14 and 16 is a contractable and expansible power element 22 which may be of any suitable pressure responsive type known in the art.

The power element 22 is securely mounted on the frame 10 by a flanged mounting stud 24 which extends through an apertured recess in the top wall 12 and secured thereto as by staking. The stud 24 is provided with an internal bore (not shown), one end of which communicates with the interior of the power element 22 while its other end receives the end of a capillary tube 26. The capillary tube protrudes through the frame 10 and its other end (not shown) is connected to the system which is to be pressure controlled. Where it protrudes from the frame 10, the capillary tube 26 is encircled by a protector in the form of a coil spring 28 to prevent breakage from sharp corners on the frame 10.

On its side opposite its mounting stud 24, the power element 22 carries an operating member including an internally threaded sleeve 30 and a conical ended, threaded screw 32 adjustably threaded into the sleeve 30. The capillary tube 26, the bored stud 24, and the power element 22, together with the operating sleeve 30 and screw 32, constitute pressure responsive means whereby the pressure of the system being controlled is reflected in the power element 22. Accordingly, variations in the system pressure produce corresponding expansion or contraction of the power element 22 which effects a corresponding axial movement of the operating cone 32.

A control arm in the form of an operating lever 34 is pivotally mounted relative to the front and rear walls 14 and 16. Adjacent one end, the lever 34 has V-notched lugs 36 and 38 projecting from opposite sides for engagement with knife edge bearings 40 and 42 provided in recessed portions of the front and rear walls 14 and 16, respectively. As is illustrated in FIG. 1, the lugs are V-notched on the undersurface of lever 34 while the top surface thereof is provided with a conical recess 44 receiving the power element button 32. The free end of lever 34 is bifurcated and provided with a connecting cross piece 46 for a purpose to be described hereinafter. Adjacent its free end, the undersurface of lever 34 defines a switch actuator surface 48.

As is illustrated in FIG. 1, the actuator 48 engages the operating plunger 50 of an electric switch 52. The details of switch 52 have not been shown inasmuch as the combination of the present invention may include any conventional snap acting switch having a common terminal post 53 and two circuit terminal posts 54 and 55. In the present arrangement, the switch 52 comprises a molded phenolic switch casing with exterior projections engaged by deformable lugs on the bottom of the front and rear walls 14 and 16 (see FIG. 5), whereby the switch and frame are assembled as a unitary control device. In this arrangement, the switching mechanism and contacts are totally enclosed with only the plunger 50 having an exposed portion, since plunger 50 engages the undersurface of lever 34, it is covered at all times whereby the switch operation is dust free.

The conical seat 44 is biased into engagement with the operating button 32 by means of a range spring 56 which biases the free end of lever 34 counterclockwise about the axis defined by the knife edge bearings 40 and 42. The range spring 56 is a coil spring having a hook portion 58 on one end and a spring nut 60 attached to its opposite end. The hook 58 is connected to the lever cross piece 46 so that the coil spring 56 is mounted in tension between the lever cross piece 46 and the spring nut 60. A hollow sleeve 62 defines a high limit stop screw and has external threads 64 for reception in the spring nut 60 and internal threads 66 for receiving a range screw 68. The external threads 64 and the international threads 66 are provided with an identical pitch; external threads 64 being ¼–60 NS and the internal threads 66 being 8–60 NS. The shank of the range screw 68 extends through an apertured recess in the frame top 12 and the head of the screw 68 is disposed on the exterior of such recess to facilitate adjustment thereof. It is to be noted that the lower end of stop screw 62 is knurled for manual adjustment thereof and that the upper end engages the undersurface of the frame top 12 to define a high limit stop.

In order to facilitate an understanding of the invention as presented so far, a sequence of operation of the device follows in connection with FIGS. 1 and 2. While the present invention may be useful in a variety of systems for control purposes, it will be described as a refrigeration controller for use in commercial and residential air conditioning systems. Thus, the compressor circuit would be connected to the switch terminals 53 and 54 and the free end of the capillary tube connected to the high pressure side of the compressor (not shown) so that the compressor circuit would cut out on exceeding the preset high pressure. By selective adjustment of the range screw 68, the controller may be set to selective operating pressures in accordance with the requirements of a particular installation, e.g., a cut out pressure of 400 p.s.i. and a cut in pressure of 300 p.s.i.

As the pressure increases by compressor operation, the power element 22 expands causing the operating lever 34 to pivot clockwise about the axis defined by the knife edges 40 and 42 whereby the range spring 56 is extended and the switch plunger 50 is depressed. At 400 p.s.i., the plunger 50 reaches the snap over point of the switch 52 and the compressor circuit is broken between the terminals 53 and 54. With the compressor deenergized, the pressure decreases and the power element 22 contracts whereby the operating lever 34 pivots counterclockwise under the return action of the range spring 56; the switch plunger 50 follows the upward movement of the lever 34. At 300 p.s.i., the plunger 50 reaches the return snap over point of the switch 52 and the compressor circuit is again completed between the terminals 53 and 54. As long as the air conditioning system is operating, the above cycling of the controller 10 defines an automatic reset feature and continues to provide a safe operation of the compressor.

The stop screw 62 provides a high pressure limit for the controller 10 and is usually factory adjusted to a pressure slightly higher than the cut out pressure. For example, the range screw 68 is rotated until compressor cut out occurs at 425 p.s.i. The range screw 68 is then restrained from turning while the limit screw is rotated by its lower knurled portion until its upper end bottoms on the undersurface of frame top 12 and because of identical pitch on the inside and outside, the range spring force does not change and the cut out setting remains at 425 p.s.i.; the spring nut 60 and limit screw 62 are integrally fixed to each other as by "Loctite" and the range screw 68 is then back off until the compressor cut out setting is 400 p.s.i. With such an arrangement, the controller 10 may be adjusted in the field by means of the range screw 68, however, the maximum adjustment is limited to the 425 p.s.i. so that the controller is protected from an improper adjustment and may be easily installed and adjusted by unskilled and untrained labor. The high limit stop arrangement also presents an added safety feature to the air conditioning system by limiting the upper pressure range of the fluid compressed by the compressor.

The automatic reset controller 10 of FIGS. 1 and 2 is is easily converted to a low pressure cut out control by connecting the compressor circuit to the switch terminals 53 and 55 and by connecting the free end of capillary tube 26 to the low pressure side of the compressor so that the compressor circuit would cut out upon decreasing below the preset low pressure. In this arrangement, the range spring 56 may be modified to accommodate lower operating pressure as by using a weaker spring or by using a spring whose spring force may be adjusted to different levels; the operating sequence of the controller would be the same as described above except for the reverse action of the switch 52 whereby the controller functions as an automatic reset with low pressure cut out. While the low pressure cut out may be set as low as 5 p.s.i., a typical example of controller settings would be compressor cut out at 10 p.s.i. and compressor cut in at 20 p.s.i.

FIGS. 3 and 4 of the drawing illustrate the same basic details of the automatic reset controller described above with the addition of means for differential adjustment. The differential of a pressure control device is defined as the difference between the cut out pressure and the cut in pressure. As is shown in FIGS. 3 and 4, a generally U-shaped bracket 70 is secured to the frame 10 as by welding its connecting portion to the rear wall 16. The shank of a differential screw 72 slidably extends through the upper leg of bracket 70 with its slotted screw head engaging the top surface of the upper leg. A stop nut 74 is threaded onto the bottom portion of the differential screw 72 to provide a means of adjusting the length thereof. A spring retainer 76 is tapped and threaded onto the screw 72 so as to be disposed between the upper and lower legs of the bracket 70. A coil spring 78 encircles the upper shank of differential screw 72 and is mounted in compression between the retainer 76 and the undersurface of the upper leg of bracket 70. Vertical alignment of the differential spring 78 is maintained by passing the stop nut 74 through a guide hole in the lower leg of bracket 70; the protruding end of the stop nut 74 engages the free end of the operating lever 34.

The combined length of the differential screw 72 and stop nut 74 is such that the stop nut 74 is in contact with the operating lever 34 at the cut in position and is separated from the operating lever 34 at the cut out position. Thus, at the cut in position, the head of the differential screw 72 is lifted from the upper leg of the bracket 70 so that the operating lever 34 is carrying the load of the differential spring 78. This load may be adjusted to any desired amount by turning the differential screw 72 which moves the spring retainer 76 to shorten or lengthen the spring 78 as desired; differentials as high as 300 p.s.i. may be obtained with this type of control.

In high pressure cut out automatic reset control with the adjustable differential feature, the system hook-up is as previously described, i.e., the compressor circuit is connected to the switch terminals 53 and 54 and the free end of the capillary tube 26 is connected to the high pressure side of the compressor so that the compressor circuit would cut out on exceeding the preset high pressure and would be automatically reset to cut in upon decreasing to the preset low pressure. As an illustration of the controller action, assume the controller has been set to cut out at 400 p.s.i. and cut in at 200 p.s.i. When the pressure on the high side of the compressor increases to 400 p.s.i., the expansion of the power element 22 pivots the operating lever 34 clockwise whereby the range spring 56 is extended and the switch 52 is actuated to break the compressor circuit between the switch terminals 53 and 54. As the pressure decreases with the compressor de-energized, the resulting contraction of the power element 22 permits the operating lever to pivot counterclockwise under the bias of the range spring 56. At approximately 370 p.s.i., the operating lever 34 engages the stop nut 74 that imposes the load of the differential spring 78 on the lever 34 to prevent further counterclockwise movement until such spring load is overcome, which occurs at approximately 230 p.s.i. At this point, the force between the lever 34 and the stop nut 74 is exactly equal to the load of the differential spring 78. Further reduction in pressure allows the lever 34 to continue its counterclockwise movement until the switch 52 reaches its snap over point and the compressor circuit is completed between the terminals 53 and 54 at the cut in pressure of 200 p.s.i.

With the controller 10 of FIGS. 3 and 4, the cut out pressure remains fixed and only the cut in pressure is affected by the adjustment of the differential spring 78. Thus, with the cut out pressure set at 400 p.s.i., the cut in pressure may be adjusted from approximately 340 p.s.i. with zero differential spring load down to 100 p.s.i.

The automatic reset controller with differential adjustment as shown in FIGS. 3 and 4 is easily converted to a low pressure cut out operation; for such an operation, the range and differential springs 56 and 78 may be modified to accommodate lower operating pressures, the compressor circuit is connected to the switch terminals 53 and 55, and the free end of the capillary tube 26 is connected to the low pressure side of the compressor so that the compressor would cut out upon a decrease of pressure to the preset low pressure. With such a system hook-up, the operating sequence would be the same as described above for the high pressure cut out operation of FIGS. 3 and 4, except for the reverse action of the switch 52 whereby the controller cuts off at a low pressure which may be set as low as 5 p.s.i. A typical setting for this type of controller would be a cut out pressure at 10 p.s.i. and a cut in pressure of 20 p.s.i.

Figure 6:
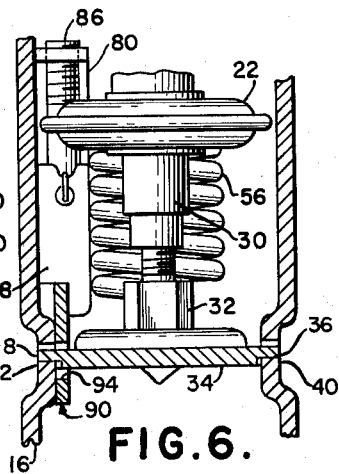
FIG. 6 is a section taken along the staggered line 6—6 of FIG. 5.

In certain types of air conditioning systems, it is desirable to provide the system controller with a manual reset, i.e., when the compressor is deenergized upon a predetermined condition, the controller must be manually reset. Such a controller is illustrated in FIGS. 5 and 6 which includes the basic components previously described in connection with FIGS. 1 and 2 so that only the new elements and new sequence of operation will be described. As is illustrated in FIGS. 5, a U-shaped reset bracket 80 is secured, as by welding, to the interior of rear wall 16 adjacent the end plate 20; the inner end of one leg 82 of the bracket 80 has a semi-circular recess axially aligned with a threaded aperture in the other leg 84. A reset screw 86 is threaded through bracket leg 84 and on its lower end carries a cylindrical boss 88 which slidably engages the semi-circular recess in bracket leg 82 for guiding the movement of the screw 86. The frame top 12 has an aperture in alignment with the screw 86 permitting the insertion of a suitable tool to adjust the screw 86 relative to the bracket 80.

A substantially flat slide element 90 is disposed along the interior of rear wall 16 for sliding movement in a direction transverse to the axis of reset screw 86. At one end, the top edge of this reset slide 90 has a projection which is slotted parallel to its longitudinal axis; this slot 92 is dimensioned so as to snugly receive a portion of the cylindrical boss 88 causing the slide 90 to follow the movement of the screw 86 for adjustment purposes. In order to provide a certain resiliency to the slide 90, an irregularly shaped slot 94 extends from the same end as the upper slot 92 and terminates adjacent the opposite end. As is illustrated in FIGS. 5 and 6, the slot 94 permits the slide 90 to straddle and clear the pivotal mounting portion of the lever 34 so that such opposite end extends through the end plate 18 and provides an exterior mounting for a perpendicularly bent tab 96 integrally formed thereon.

A generally rectangular lug 98 is bent inwardly from one end of the rear wall 16 adjacent the slide 90; the lower end of lug 98 is notched to receive the slide 90 for retaining the same and guiding its movement. Between the upper end of lug 98 and an intermediate portion of the slide 90, a coil spring 99 is mounted in tension by any suitable means such as looping the spring ends through retaining apertures. The coil spring 99 biases the slide 90 to the left as viewed in FIG. 5.

Adjacent the end with slot 92 and spaced below the slot 94, the slide 90 has a punched out portion 100 for the reception of a latching tab 35 projecting from a longitudinal edge of the lever 34. As is illustrated in FIG. 7, the cut out portion 100 has two differently sized end portions to define a T-shaped slot, the right end having an upper edge 102 and being centrally joined to the left end by top and bottom perpendicular edges 104 and 106.

Figure 7:
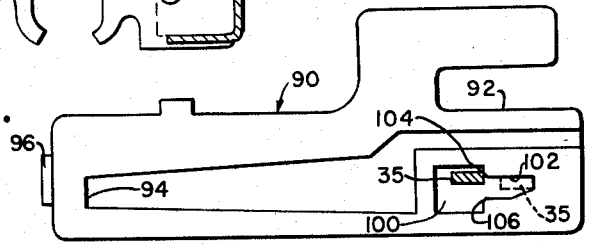
FIG. 7 is an elevation view of a detail of FIG. 5 with another operating position shown in dashed lines.

FIGS. 5, 6, and 7 represent a high pressure cut out controller with manual reset and the system hook-up is as previously described, i.e., the compressor circuit is connected to the switch terminals 53 and 54 and the free end of the capillary tube 26 is connected to the high pressure side of the compressor so as to cut out the compressor circuit on exceeding the preset high pressure. Assuming the controller has been set to cut out at 400 p.s.i. and to cut in at 300 p.s.i., FIG. 7 represents the position of latching lug 35 when the compressor is energized and pressure increases cause expansion of the power element 22 and clockwise pivoting of lever 34. When the pressure on the high side of the compressor reaches 400 p.s.i., the switch 52 breaks the compressor circuit between the terminals 53 and 54; simultaneously the latching tab 35 is moved downwardly from the latching slot edge 104. As soon as the tab 35 clears the edge 104, the slide 90 is released and moves to the left under the bias of reset spring 99 to the position illustrated in FIG. 5. Thus, upon cut out, the latching tab 35 is disposed in the dashed line position shown in FIG. 7, i.e., flat against the slide edge 102. With the slide 90 in its cut out position, the lever 34 cannot move upward (counterclockwise) regardless of how low the pressure in the power element 22 becomes. Accordingly, the controller must be manually reset to resume operation and this is effected by manually pushing the exterior tab 96 to displace the slide 90 to the right as viewed in FIG. 5, whereupon the latching edge 102 is moved away from the latching tab 35 and the lever 34 is released for upward movement. The slide 90 may be reset at any pressure slightly below the cut out pressure and remain latched therein by engagement with the latching edge 104; however, the switch 52 will not reclose until the pressure decreases to the cut in pressure of 300 p.s.i. In the event the slide 90 is manually reset before cut in pressure is reached, the tab 35 and edge 104 prevent lengthwise movement of the slide 90, but the lever 34 is free for pivotal movement because the tab 35 is disposed in the larger part of the T slot 100.

The reset screw 86 provides a means for adjusting the T slot 100 with respect to the position of the lever 34. Such adjustment is effected by setting the lever 34 to a cut out position corresponding to 400 p.s.i. and then rotating the reset screw 86 causing the slide 90 to follow the movement of the cylindrical boss 88. As soon as the latching edge 104 clears the lever tab 35, the slide 90 moves to the left as viewed in FIG. 5.

Figure 8:
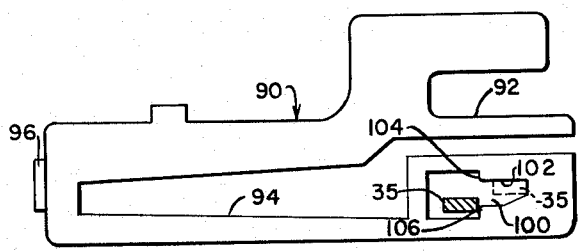
FIG. 8 is an elevation view similar to FIG. 7 showing a different arrangement and showing another operating position in dashed lines.

The manual reset, high pressure cut out controller of FIGS. 5, 6, and 7 is easily converted to a low pressure cut out operation with manual reset by modifying the range spring force to accommodate lower operating pressures, by connecting the compressor circuit to the switch terminals 53 and 55 and by connecting the free end of the capillary tube 26 to the low pressure side of the compressor. The operating sequence would be the same as described above for FIG. 5 except for the reverse action of the switch 52 whereby the controller cuts off at a low pressure which may be set at 10 p.s.i. In addition, the slide 90 is latched in its cut in position by the front edge of tab 35 engaging the bottom edge 106 of slot 100 as shown in FIG. 8. Upon decrease to the predetermined low pressure, the lever tab 35 moves upward and clears the latching edge 106 permitting the slide 90 to shift to the left; then the lever tab 35 is disposed in the smaller area of the T slot 100 engaging the latching edge 102. In this cut out position, the lever 34 cannot move upwards (counterclockwise) regardless of increasing pressure in the power element 22 until after the controller is manually reset. In the manual reset, low pressure cut out control device, the reset screw 86 causes the T slot 100 to be moved downwardly during adjustment until the lever tab 35 just clears the corner of the latching edge 106 (FIG. 8).

Figure 9:
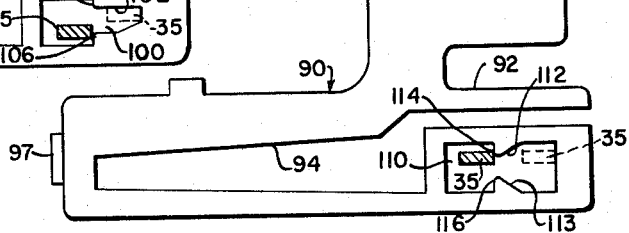
FIG. 9 is an elevation view of a modified detail of FIG. 5 with another operating position shown in dashed lines; and, FIG. 10 is an elevation view similar to FIG. 9 showing a different arrangement and showing another operating position in dashed lines.
Figure 10:
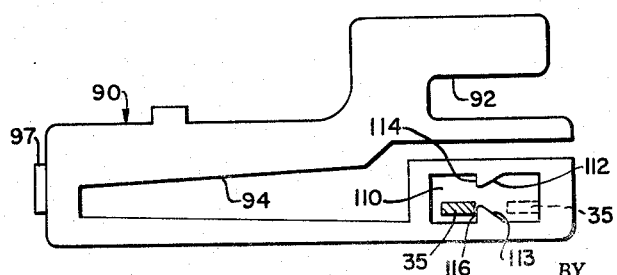

FIGS. 9 and 10 illustrate the pertinent parts of an automatic reset controller with a trip flag in which the slide 90 is utilized to indicate that a cut out has occurred and which differs from FIGS. 7 and 8 in that end tab 97 constitutes a trip flag and in the shape of the latching slot 110. The slot 110 has two end portions of substantially the same size with each end being sufficiently large to permit upward and downward movement of lever tab 35. The right end of slot 110 has top and bottom edges 112 and 113 sloping toward each other and terminating at corner junctions with top and bottom perpendicular edges 114 and 116 of the left end.

An automatic reset, high pressure cut out controller with a trip flag utilizes the slide element 90 of FIG. 9. The lever tab 35 is shown as engaging the latching edge 114 and as soon as the predetermined high cut out pressure is reached, the lever tab 35 clears the corner of edge 114 and the slide 90 is biased to the left by the coil spring 99. The trip flag 97 now indicates that the compressor has been cut out. The trip flag 97 remains in its tripped position until it is manually reset; however, the controller will continue its automatic reset operation even without manually resetting the trip flag 97. Such an automatic reset operation is possible because the lever tab 35, as shown in dashed lines in FIG. 9, is not restrained from up and down movement in the enlarged right end portion of slot 110.

The trip flag 97 may be manually reset by pushing the slide 90 to the right as viewed in FIG. 9. During such movement, the sloping edge 112 engages the lever tab 35 and because of the resiliency in the slide 90 effected by its elongated slot 94, the sloping edge 112 simply springs up and over the lever tab 35.

An automatic reset, low pressure cut out controller with a trip flag utilizes the slide element 90 of FIG. 10 and the controller operation is converted in the same manner as mentioned above in connection with FIG. 8. In this instance, the slide 90 is latched in its cut in position by the front edge 116. Upon decrease to the predetermined low pressure, the lever tab 35 moves upward and clears the latching edge 116 permitting the slide 90 to shift to the left. The lever tab 35 is then located in the right end of slot 110 wherein automatic reset operation of the switch 52 continues even without manually resetting the trip flag 97.

The various arrangements of the present invention illustrate the simplicity and advantage of fabricating a pressure responsive control device into a compact structure that is easily converted for particular requirements of the system being controlled. In addition to being separately utilized as high or low pressure safety cutouts, or as operating controls, the described controllers may be arranged into any combination by means of a single mounting bracket; for example, two of such controllers may be combined into a dual pressure cut out control device to provide the function of both the high cut out and low cut out pressure controls in a single package.

Inasmuch as the present invention is subject to many variations, modifications and changes in structural details, it is intended that all matter contained in the foregoing description and shown on the accompanying drawings, shall be interpreted as illustrative and not in a limiting sense.

What is claimed is:

1. A pressure responsive control device comprising a housing frame, an operating lever pivotally mounted on said frame, pressure responsive means including a power element mounted on said frame above said lever for engagement therewith, a range spring having one end connected to said lever, a spring nut connected to an opposite end of said range spring, a range adjustment screw carried by said frame and connected to said spring nut for adjusting said range spring, switch means carried by said housing below said lever for actuation thereby, said switch means including a plurality of terminal posts for selective connection to one of a plurality of electrical circuits, bracket means mounted on said frame, screw means slidably mounted on said bracket means and engaging said lever, differential spring means biasing said screw means whereby a differential spring load is applied to said lever.

2. The combination as recited in claim 1 wherein said screw means includes a threaded screw, a stop nut adjustably mounted thereon and a spring retainer disposed on said threaded screw, and wherein said differential spring means includes a coil spring surrounding said threaded screw and mounted in compression between said bracket means and said spring retainer.

3. The combination as recited in claim 2 wherein said bracket means includes a U-shaped bracket having spaced legs with aligned apertures therein, and wherein said threaded screw and said stop nut are slidably disposed through said aligned apertures.

4. A pressure responsive control device comprising a housing frame, an operating lever pivotally mounted on said frame, pressure responsive means including a power element carried by said frame and engaging said lever, switch means mounted on said frame adjacent said lever and being actuated thereby in accordance with operation of said power element, a range adjusting screw carried by said frame, a range spring having one fixed end and an opposite end connected to said lever, a spring nut defining means for securing the fixed end of said range spring, and sleeve means defining a connection between said spring nut and said range adjusting screw to define a stop means for the control device.

5. The combination as recited in claim 4 wherein said connection sleeve means includes means to permit adjustment of said stop means without adjusting said range adjusting screw.

6. The combination as recited in claim 4 wherein said connection sleeve means includes a hollow sleeve having external threads for connection with said spring nut and internal threads receiving said range adjusting screw.

7. The combination as recited in claim 6 wherein said internal and external threads have the same pitch whereby the hollow sleeve may be adjusted relative to the range adjusting screw without affecting the same.

8. In a pressure responsive control device, the combination comprising switch means movable between a plurality of circuit controlling positions, biased lever means operating said switch means in accordance with pressure variations, a slide element movable between a plurality of positions corresponding to the circuit controlling positions, and a cut out slot on said slide element, and tab means on said lever means disposed in said slot on said slide element whereby said switch means and said slide element are independently and simultaneously moved to corresponding positions.

9. In a pressure responsive control device, the combination comprising a housing frame, an operating lever pivotally carried by said frame, pressure responsive means including a power element carried by said frame and being in engagement with said lever, biasing means carried by said frame and being connected to said lever whereby said biasing means and said power element effect pivotal movement of said lever, switch means operable between a plurality of controlling positions and being disposed on said frame for operation by said lever means, a slide element slidably disposed on said frame for movement between a plurality of positions corresponding to the controlling positions of said switch means, a cut out slot on said slide element having a pair of end portions separated by latching edge means, a latching tab on said lever disposed in said slot, biasing means acting on said slide element whereby said latching edge means is biased against said latching tab, said latching tab being displaced from said latching edge means upon pivotal movement of said lever whereby said slide element is released when said lever operates said switch means.

10. The combination as recited in claim 9 wherein said latching edge means includes top and bottom portions for selective engagement by said latching tab.

11. The combination as recited in claim 10 wherein said slide element has an end tab and one end portion of said slot retains said latching tab whereby pivotal movement of said lever is prevented until said slide element is manually reset by pushing on said end tab.

12. The combination as recited in claim 10 wherein said top and bottom portions of said latching edge means are respectively joined by sloping edge portions in one end portion of said slot.

13. The combination as recited in claim 12 wherein each end portion is of sufficient dimension to permit movement of said latching tab therein whereby pivotal movement of said lever is permitted without manually resetting said slide element.

14. The combination as recited in claim 13 wherein said end tab on said slide element defines a trip flag to indicate the position of said slide element.

References Cited by the Examiner
UNITED STATES PATENTS

| | | | |
|---|---|---|---|
| 1,703,235 | 2/1929 | Heath | 200—140 X |
| 2,425,447 | 8/1947 | Wagner | 200—83 |
| 2,447,894 | 8/1948 | Bauman | 200—140 X |

BERNARD A. GILHEANY, *Primary Examiner.*

H. M. FLECK, JR., *Assistant Examiner.*